(12) United States Patent
Zhu et al.

(10) Patent No.: US 7,149,987 B2
(45) Date of Patent: Dec. 12, 2006

(54) METHOD AND APPARATUS FOR PERFORMING GENERATOR-BASED VERIFICATION

(75) Inventors: Yunshan Zhu, Cupertino, CA (US); James H. Kukula, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 423 days.

(21) Appl. No.: 10/796,620

(22) Filed: Mar. 8, 2004

(65) Prior Publication Data

US 2005/0198597 A1    Sep. 8, 2005

(51) Int. Cl.
*G06F 17/50* (2006.01)
(52) U.S. Cl. .............................. 716/4; 716/5
(58) Field of Classification Search ............ 716/4, 716/5
See application file for complete search history.

(56) References Cited

U.S. PATENT DOCUMENTS

| | | | |
|---|---|---|---|
| 6,647,513 B1 * | 11/2003 | Hekmatpour | 714/37 |
| 7,007,251 B1 * | 2/2006 | Hekmatpour | 716/4 |
| 2004/0006751 A1 * | 1/2004 | Kawabe et al. | 716/4 |
| 2005/0102596 A1 * | 5/2005 | Hekmatpour | 714/741 |
| 2006/0122834 A1 * | 6/2006 | Bennett | 704/256 |

\* cited by examiner

*Primary Examiner*—Paul Dinh
*Assistant Examiner*—Magid Y. Dimyan
(74) *Attorney, Agent, or Firm*—Park, Vaughan & Fleming LLP

(57) ABSTRACT

One embodiment of the present invention provides a system that verifies whether a trace can be produced by a generator. A generator is defined as a finite state machine with a set of input and output signals. A trace is defined as a sequence of assignments of non-parametric input and output signals of the generator. The generator may contain parametric inputs to model non-determinism. The trace does not contain assignments of the parametric inputs. During operation, the system builds a data structure to determine if there exists a sequence of parametric input assignments that can match the non-parametric inputs and outputs of the generator with the ones specified in the trace.

22 Claims, 3 Drawing Sheets

METHOD AND APPARATUS FOR PERFORMING GENERATOR-BASED VERIFICATION

BACKGROUND

1. Field of the Invention

The present invention relates to techniques for verifying designs for digital systems. More specifically, the present invention relates to a method and an apparatus for determining if a trace can be produced by a generator, where the trace is defined as a sequence of assignments to the external interface signals of the generator.

2. Related Art

Verifying a design generally involves deciding whether the design will guarantee that its outputs satisfy some set of properties, under the assumption that its inputs satisfy some other properties. The properties the design is to guarantee are often expressed as checkers, which "observe" the design's input/output behaviors and either "accept" or "reject" the behaviors. Checkers are also referred to as "monitors" or "assertions."

In contrast, the input behavior that the design can assume is often expressed as a generator, which "produces" legal inputs to the design based on the design's outputs and internal generator states. Hence, the generator provides a general model for the legal environments in which the design is intended to operate.

While checkers and generators are used in different roles in design verification, they share an underlying semantics which defines a set of input/output traces. More specifically, a given set of traces can be expressed either as a generator or as a checker. Deciding which representation to use involves considering two criteria: ease of expression, and tool support for a particular form of representation (checker or generator) in a particular verification role (assumption or guarantee). Neither form of representation is universally easier for expressing traces. For instance, the correctness of a sorting circuit involves two conditions: the values in the output array should vary monotonically with the array indices, and should be a permutation of the sorter's input array. Monotonicity is more easily expressed in the checker representation, while it is easier to use a generator to define the set of input permutations that must contain the sorter's output. There does not seem to be any general rule for predicting which traces will be more easily expressed by which representation. Tool support for the various combinations of role and representation is needed.

Compositional verification is a methodology where verification of a complete system is performed by separately verifying each of the blocks from which the system is constructed. These smaller verification sub-tasks can be much more effective with both simulation and formal tools, mainly because the exposed block interfaces give better controllability and observability. In compositional verification, one block's guarantee is used as a connected block's assumption, and vice versa. Consequently, over the set of block verifications involved in the compositional verification of a system, a single trace set representation will need to be used in both roles, as an assumption and as a guarantee. Thus, the choice of representation for a trace set cannot be governed by tool support for the particular role that trace set will play in any one block's verification, because that trace set will serve the complementary role in some other block's verification.

Tables 1 and 2 summarize the approaches used by these tools to support these representations in the two different roles. In both classes of tools, the generator representation is most natural in the role of block assumption, and the checker representation in the guarantee role. Checkers are also easily incorporated as assumptions in formal verification.

TABLE 1

|  | assumption | guarantee |
|---|---|---|
| checker | stimulus generation | assertion |
| generator | testbench | trace checking |

TABLE 2

|  | assumption | guarantee |
|---|---|---|
| checker | constraint | assertion |
| generator | testbench | refinement checking |

Using a checker as an assumption for, which is referred to as "stimulus generation," has been recently studied by a number of researchers, and a number of solutions have been proposed.

Using a generator as a guarantee is also a non-trivial problem. Note that to simulate against a guarantee represented as a generator, one must test if the trace of a simulation run can be produced by the generator. We refer to the verification problem as "trace checking." To date, the trace checking problem has not been significantly investigated, and effective solutions have not been developed.

Hence, what is needed is a method and an apparatus for efficiently performing a trace checking operation.

SUMMARY

One embodiment of the present invention provides a system that verifies whether a trace can be produced by a generator. A generator is defined as a finite state machine with a set of input and output signals. The set of input signals are divided into parametric inputs and non-parametric inputs. The generator uses parametric inputs to model non-determinism. A trace is defined as a sequence of assignments of non-parametric input and output signals of the generator. The trace does not contain assignments of the parametric inputs. During operation, the system builds a data structure to determine if there exists a sequence of parametric input assignments that can match the non-parametric inputs and outputs of the generator with the ones specified in the trace.

In a variation on this embodiment, the generator is sequentially deterministic, which means that there exists a single next state for each combination of current state, non-parametric input and output. In this variation, the system uses a data structure to perform a satisfiability test to determine if there exist any parametric inputs that can match the non-parametric input and output assignment of the generator with the ones of the trace at current state. Next, the system uses the current state, non-parametric input and output to determine a unique next state of the generator. The system iterates this test through the sequence of input and output assignments in the trace.

In a variation on this embodiment, the generator is sequentially non-deterministic, which means that the next state can depend on parametric input, and consequently there can exist more than one next state for some combinations of current state, non-parametric input, and output. In this variation, the system determines if the non-parametric input and output assignments in a trace are consistent with a generator by determining the set of next states of a generator. This determination involves considering all possible parametric inputs, all states in a current set of states, the non-parametric input and the output. If there exists at least one state in the set of next states, the system determines that the non-parametric input and output are consistent.

In a variation on this embodiment, the system determines the set of next states by computing a forward image and constraining the parametric input and output to their assignments in the trace.

In a variation on this embodiment, the trace is produced by a simulation of a system under test.

In a variation on this embodiment, the data structure is in the form of a binary decision diagram (BDD).

In a variation on this embodiment, if the non-parametric input and output are not consistent with a generator output, the trace is not valid.

In a variation on this embodiment, the generator uses a function with parametric inputs to model non-determinism.

In a variation on this embodiment, if the specification of the generator indicates that the block under test is sequentially deterministic, and hence does not depend on parametric inputs, the method further comprises translating a generator into a checker and using that checker to verify a trace.

Figure 1:
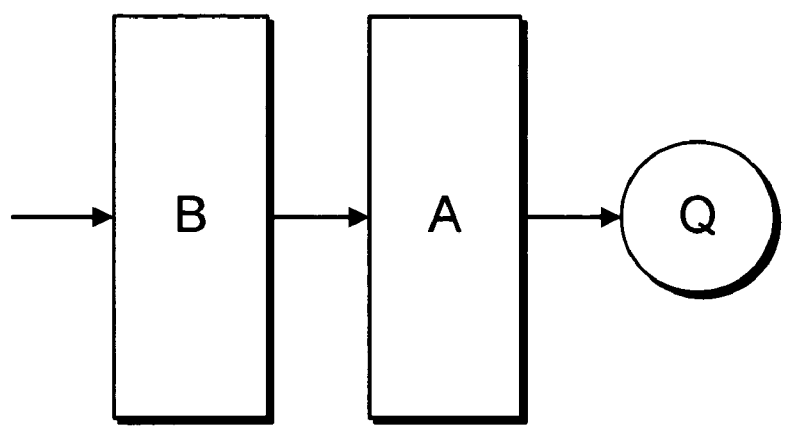
FIG. 1 illustrates a simple system to be verified in accordance with an embodiment of the present invention.

Table 1 illustrates roles and representations in simulation in accordance with an embodiment of the present invention.

Table 2 illustrates roles and representations in formal verification in accordance with an embodiment of the present invention.

Table 3 illustrates a technique for trace checking using an SSD generator in accordance with an embodiment of the present invention.

Table 4 illustrates an exemplary SSD generator in accordance with an embodiment of the present invention.

Table 5 illustrates a stimulus generation procedure in accordance with an embodiment of the present invention.

Table 6 illustrates a technique for trace checking using an FSD generator in accordance with an embodiment of the present invention.

Table 7 illustrates a technique for a trace checking using an SND generator in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Trace Checking

To develop efficient techniques for trace checking, we classify generators into three groups: structurally sequentially deterministic (SSD), functionally sequentially deterministic (FSD) and sequentially non deterministic (SND). More details on the generator representations will be discussed herein.

Formal methods can be used to verify that every trace emitted by a design is in the set of traces defined by a generator, i.e. that the design guarantees the property represented by the generator. This comparison of a design against a generator is known as the "refinement checking" problem. In the general case, where a guarantee generator is sequentially non-deterministic, refinement checking has been determined to be PSPACE complete with respect to the number of generator states. Existing approaches of refinement checking require manual construction of refinement maps or witness functions. We present practical and techniques for refinement checking where the guarantee generator is restricted to be sequentially deterministic.

Representation

DEFINITION 1: Let V be a finite set of boolean variables $\{v_1, v_2, \ldots, v_n\}$. A trace over V is an infinite sequence $\pi = \alpha_0 \alpha_1 \ldots$, where each $\alpha_i$ is a complete assignment of variables in V at time i. For $D \subseteq V$, $\alpha_{\downarrow D}$ denotes the projection of assignment $\alpha$ to the subset of variables in D. We refer to V as the type of trace $\pi$.

We define checkers and generators as special types of automata as follows.

DEFINITION 2: A checker is a Mealy machine defined by the tuple $\hat{M} = <S, s_0, I, v, f_v, f_S>$, where S is a finite set of states, $s_0 \in S$ is the initial state, $I = D_I \cup D_O$ is a finite set of input variables. $D_I$ denotes design inputs and $D_O$ denotes design outputs. $D_I \cap D_O = \emptyset$. v is an output variable. $f_v: S \times \Sigma_I \to \{0,1\}$ is the output function, where $\Sigma_I$ represents the set of all possible assignments of I. $f_S: S \times \Sigma_I \to S$ is the next state function. Both $f_v$ and $f_S$ are total functions.

When composing a guarantee checker with a design under test (DUT), $D_I$ is connected to the corresponding DUT input signals and $D_O$ to the corresponding DUT output signals. Both $D_I$ and $D_O$ are inputs to the checker. All inputs of a checker are connected to their corresponding design signals in a proper composition. By our definition, a checker is deterministic, i.e., there is a single next state and output for every current state and input combination.

Note that an additional restriction can be imposed on checkers. In particular, the valid signal may only depend on variables in $S \cup D_O$, but not in $D_I$. $f_v: S \times \Sigma_{D_O} \to \{0,1\}$. The restriction is referred to as "output separability." Such restricted checkers are sufficient to specify behaviors that can be modeled as Moore machines.

DEFINITION 3: Assume $\pi=\alpha_0\alpha_1\ldots$ is an infinite trace of type $D_I \cup D_O$. $\pi$ is accepted by $\check{M}$, or $\pi \models \check{M}$, iff there exists an infinite sequence of states $S=s_0s_1\ldots$ such that (1) $s_0$ is the initial state; (2) $\forall i\ s_{i+1}=f_S(s_i, \alpha_i)$; (3) $\forall i\ f_{v(si)}, \alpha_i)=1$. We interpret a checker as the set of all traces $I(\check{M})$ accepted by $\check{M}$, formally, $I(\check{M})=\{\pi|\pi \models \check{M}\}$.

DEFINITION 4: A generator is a Mealy machine defined by the tuple $\vec{M}=<S, s_0, I, O, f_O, f_S>$, where S is a finite set of states, $s_0 \in S$ is the initial state, $I=D_I \cup P$ is a finite set of input variables. $D_I$ denotes the set of design inputs (or non-parametric inputs), and P denotes the set of parametric inputs. $O=D_O$ is a finite set of output variables. $D_O$ denotes the set of design outputs. $I \cap O = \emptyset$. $f_O:S \times \Sigma_I \to \Sigma_O$ is the output function, where $\Sigma_I$ and $\Sigma_O$ represent the set of all possible assignments of I and O, respectively. $f_S:S \times \Sigma_I \to S$ is the next state function. Both $f_O$ and $f_S$ are total functions.

Parametric input variables P model non-determinism in a generator.

DEFINITION 5: Assume $\pi=\alpha_0\alpha_1\ldots$ is an infinite trace of type $D_I \cup O$. $\pi$ is generated by $\vec{M}$, or $\pi \models \vec{M}$, iff there exists an infinite sequence of states $S=s_0s_1\ldots$ and an infinite trace $\sigma=\beta_0\beta_1\ldots$ of type P, such that (1) $s_0$ is the initial state; (2) $\forall i\ s_{i+1}=f_S(s_i, \alpha_{i\downarrow DI}, \beta_i)$; (3) $\forall i\ \alpha_{i\downarrow DO}=f_O(s_i, \alpha_{i\downarrow DI}, \beta_i)$; We interpret a generator as the set of all traces generated by $\vec{M}$, formally, $I(\vec{M})=\{\pi|\pi \models \vec{M}\}$.

Special Cases

DEFINITION 6: A generator $\vec{M}$ is sequentially deterministic if there is a single next state for each assignment of S, $D_I$ and $D_O$, i.e.

$$f_O(s,d_I,p)=f_O(s,d_I,p') \to f_S(s,d_I,p)=f_S(s,d_I,p') \quad (1)$$

where s, $d_I$ and $d_O$ denote vectors of state variables, design input variables, and design output variables, respectively.

A checker, by our definition, is sequentially deterministic, if we treat the checker's validity output $f_v$ as a specific instance of the general generator output function $f_O$. Its next state is determined by the assignment of variables in S, $D_I$ and $D_O$. The difference between a checker and a sequentially deterministic generator lies in their combinational representations of design outputs. A checker uses a relation to represent design outputs, i.e. $f_v(s, d_I, d_O)=1$. A generator uses a function with parametric inputs, i.e. $f_o(d_I, s, p)$. An equivalent relation can be obtained by explicitly introducing the output variables $d_O$ and quantifying the parametric inputs, i.e. $f_v(s, d_I, d_O)=\exists p(d_O=f_o(d_I, s, p))$. Each representation can be more suitable in certain situations. For example, the set of variable assignments d that satisfies a boolean formula B can be expressed a relation $B(d)=1$. On the other hand, the set of composite natural numbers is more easily expressed as a function with parametric inputs $d=x \times y$.

Methodology

FIG. 1 illustrates a simple system with two functional blocks, A and B. The verification task is to check that when the inputs to block A are driven by the outputs of block B, the outputs of A satisfy property Q. The simplest way to attack this problem is simply to connect B to A and search for an input sequence to B that causes the outputs of A to violate Q. A variety of methods can be used for this search, including simulation of random vectors or manually constructed sequences, or formal methods such as model checking. In any of these techniques, the size of the system can become an impediment to the effectiveness of the search. It can be very difficult to find inputs to B that cause it to emit sequences that will exercise A thoroughly and expose any possible violations of Q.

Figure 2:
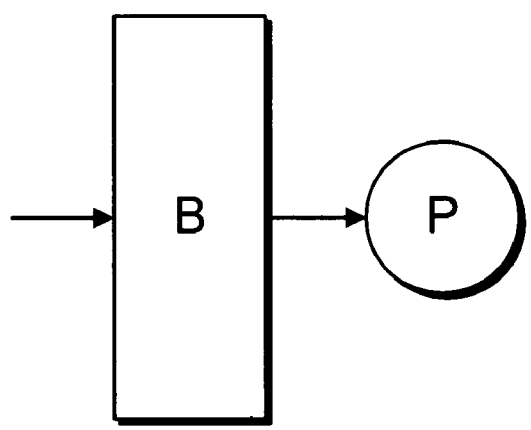
FIG. 2 illustrates compositional verification in accordance with an embodiment of the present invention.
Figure 2:
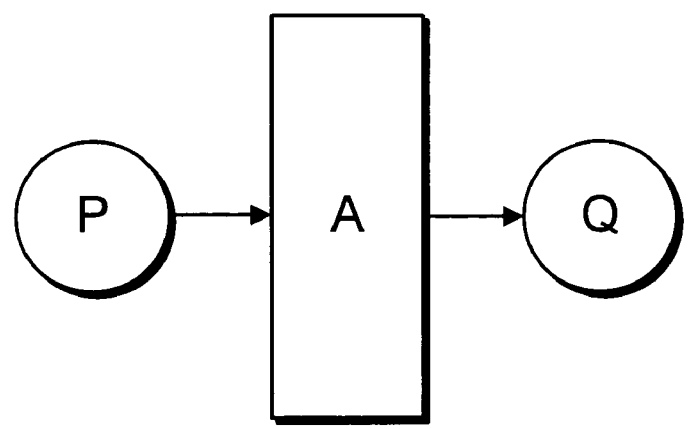

Compositional verification enables much more effective searching for erroneous behaviors. To enable compositional verification, the system designer must provide additional block specifications in a form that verification tools can interpret. In FIG. 2, property P has been introduced to specify the legal communication between blocks A and B. Block A is required to guarantee property Q, under the assumption that its inputs obey property P. Block B is then required to guarantee property P. The system verification problem, to check that A and B connected will together guarantee Q, has thus been broken into two simpler block verification problems.

This becomes a simple example of assume-guarantee reasoning: if A can guarantee Q assuming P, and B can guarantee P, then one can conclude that the system composed of A and B will guarantee Q. Note that the converse is not true. It is possible to err in expressing P so that the entire system does guarantee Q, yet one or both of the block verifications fails. Compositional verification requires accurate block specification. What this approach accomplishes is to achieve dramatically more effective block level searches for design errors.

In a previous section of this specification we defined two forms of specification, checkers and generators. Consider property P. In performing compositional verification of our simple example, one has a choice to express P in the form of a checker or in the form of a generator. Let us examine the consequences of this decision.

If P is expressed as a checker, the block verification of B becomes possible through conventional simulation methods. The sequence of outputs of B are simply fed into the checker inputs and the checker output is observed. If the output is ever observed to have a 0 value, a property violation will have been detected. Simulation of block A is a bit more challenging, though. At each simulation cycle, an input vector must be constructed for which the checker for P will output a 1 value. P may well have a changing internal state, so this input vector construction problem is changing cycle by cycle. Previous research has studied techniques to efficiently solve this stimulus generation problem.

If P is instead expressed as a generator, simulation of block A becomes very straightforward. One simply drives the parametric inputs of the generator for P with directed or random stimulus, and observes the output of a checker for property Q. In this case, it is the simulation of block B that becomes more difficult. To verify the block simulation, one must check if the design output can be matched by the generator output. The difficulty here is to find parametric input assignments that produce a matching generator output.

The techniques we develop below address this problem of block verification when the property the block is required to guarantee is expressed as a generator. We will consider both simulation and formal verification techniques. Simulation generates a single trace, which then can be compared against the set of traces of the generator. In formal verification the block itself is analyzed to check the complete set of output traces it can emit.

With these trace checking and refinement checking techniques, tool support becomes available for every combination of role and representation. Thus, the decision of which representation to use need not be constrained by tool support limitations. Ease of expression for a particular trace set remains a criterion. Efficient tool processing is also a criterion. A checker or generator is often written at Register Transfer Level (RTL) in a High Level Design Language such as Verilog, or in some assertion language. Using a checker as a guarantee and a generator as an assumption can take advantage of RTL simulation, and is therefore very efficient. Both stimulus generation and trace checking typically involve formal reasoning and are often slower. To use a checker as an assumption, a simulator must interact with stimulus generation each cycle to obtain legal input stimulus. It is observed that simulation generation time represents a significant portion of total simulation time, sometimes more than 50 percent.

A generator as guarantee, however, can be used offline—a simulator can save the simulation trace in a dump file to be checked later against the generator. This does not affect overall CPU time, but unburdening simulation lets the designer more quickly address other bugs and free limited resources such as software licenses for EDA simulation tools and computer memory. Thus, it seems from a tool efficiency perspective, the generator representation has an overall efficiency advantage.

Flow Summary and Context

Figure 3:
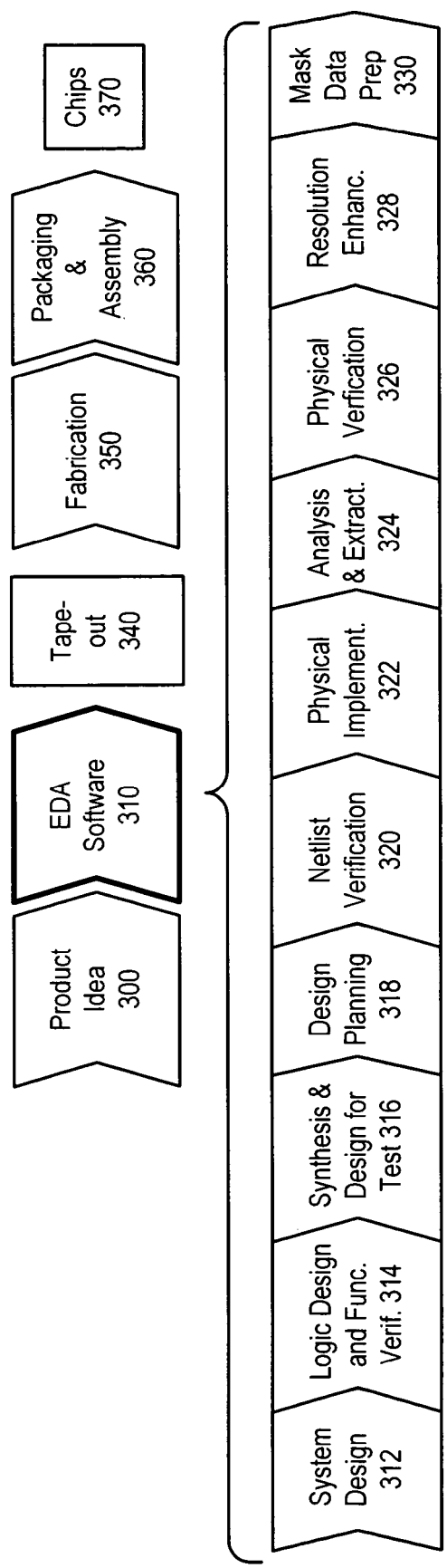
FIG. 3 presents a simplified representation of an exemplary digital ASIC design flow.

Before proceeding further with the description, it may be helpful to place this process in context. FIG. 3 shows a simplified representation of an exemplary digital ASIC design flow. At a high level, the process starts with the product idea (step 300) and is realized in a EDA software design process (step 310). When the design is finalized, it can be taped-out (event 340). After tape out, the fabrication process (step 350) and packaging and assembly processes (step 360) occur resulting, ultimately, in finished chips (result 370).

The EDA software design process (step 310) is actually composed of a number of steps 312–330, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 310) will now be provided:

System design (step 312): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 314): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 316): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Design planning (step 318): Here, an overall floorplan for the chip is constructed and analyzed for timing and top-level routing. Exemplary EDA software products from Synopsys, Inc. that can be used at this step include Jupiter and Flooplan Compiler products.

Netlist verification (step 320): At this step, the netlist is checked for compliance with timing constraints and for correspondence with the VHDL/Verilog source code. Exemplary EDA software products from Synopsys, Inc. that can be used at this step include VCS, VERA, Formality and PrimeTime products.

Physical implementation (step 322): The placement (positioning of circuit elements) and routing (connection of the same) occurs at this step. Exemplary EDA software products from Synopsys, Inc. that can be used at this step include the Astro product.

Analysis and extraction (step 324): At this step, the circuit function is verified at a transistor level, this in turn permits what-if refinement. Exemplary EDA software products from Synopsys, Inc. that can be used at this step include Star RC/XT, Raphael, and Aurora products.

Physical verification (step 326): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 328): This step involves geometric manipulations of the layout to improve manufacturability of the design. Exemplary EDA software products from Synopsys, Inc. that can be used at this step include iN-Phase, Proteus, and AFGen products.

Mask data preparation (step 330): This step provides the "tape-out" data for production of masks for lithographic use to produce finished chips. Exemplary EDA software products from Synopsys, Inc. that can be used at this step include the CATS(R) family of products.

Trace Checking

The trace checking process can take place during the logic design and functional verification step 314 described above.

The trace checking problem is defined as follows. Given a trace $\pi = \alpha_0 \alpha_1 \ldots$ and a generator $\vec{M}$, check whether $\pi$ can be generated by $\vec{M}$, or mathematically, $\pi \models \vec{M}$.

The trace checking problems arise in practice when a generator is used as a guarantee in simulation. To be compatible with well-established theories on temporal logic, we have defined traces to be infinite. Any actual simulation runs, however long, must terminate and therefore will produce only finite traces. In this example, we focus on safety properties, for which a simple solution exists. A finite trace satisfies a generator iff it is a prefix of a satisfying infinite trace.

The techniques presented in this section determine whether the finite prefix can indeed be generated. A generator provides at least one legal output for every combination of generator state and non-parametric input. Thus, any finite trace generated by a generator can be extended indefinitely, by simulating the generator with arbitrary input combinations and using the corresponding input/output assignments to extend the finite trace. Thus, any finite trace generated by a generator is a prefix of some infinite trace generated by the generator. In contrast, a checker can have one or more combinations of checker states and inputs for which no output is accepted as valid. These states are known as dead-end states. A finite trace can exist which the checker accepted as valid at every step, but if that trace leads to such a dead-end state, then the trace cannot be extended. Thus, the fact that a checker has accepted a finite trace does not imply that that finite trace is a prefix of any infinite trace that the checker would accept.

Figure 4:
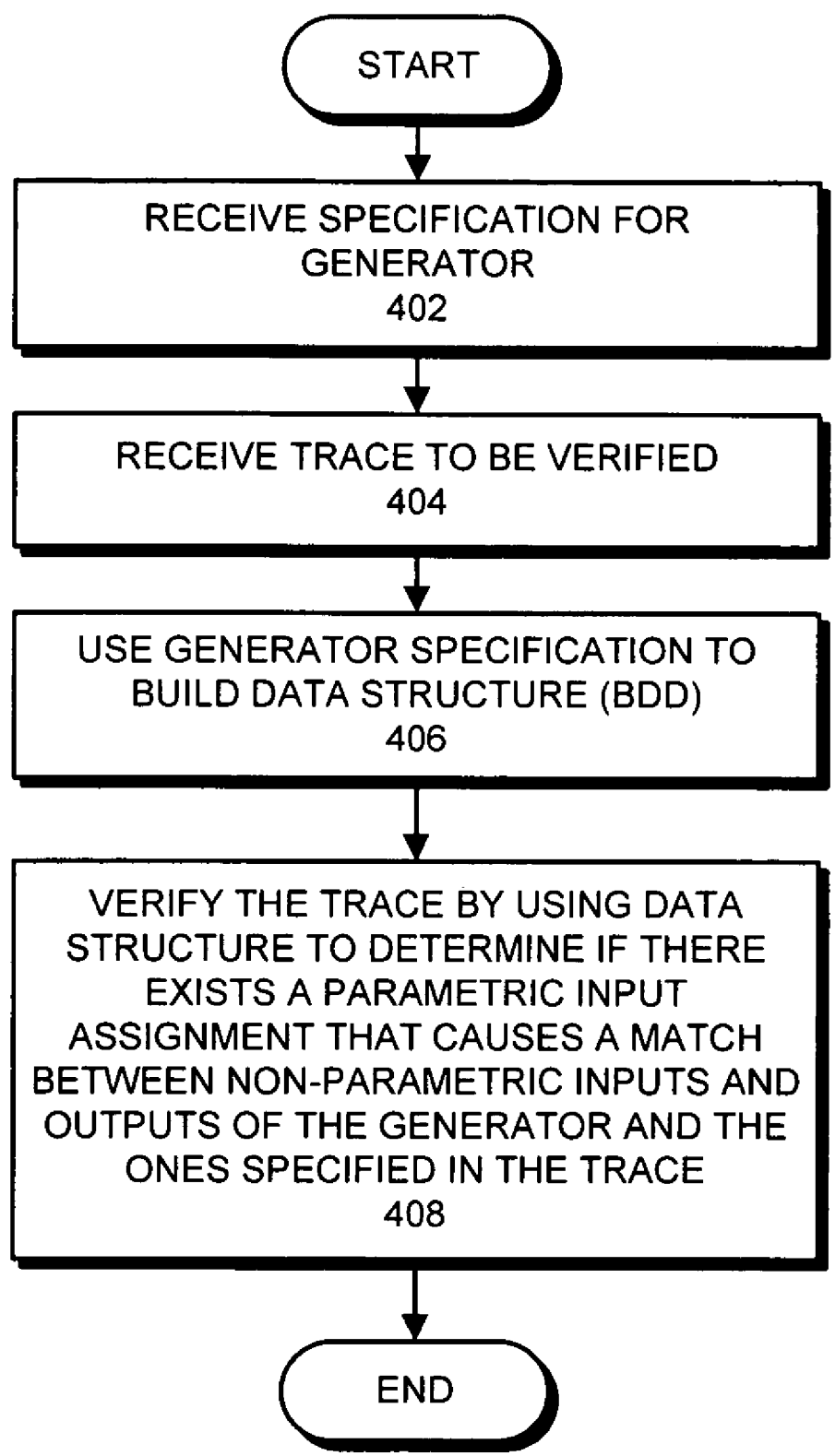
FIG. 4 presents a flow chart illustrating the process of determining if a trace can be produced by a generator in accordance with an embodiment of the present invention.

Referring to the flow chart illustrated in FIG. 4, at a very high level, the trace checking problem proceeds as follows. The system first receives a specification for a generator (step 402), wherein the generator is a finite state machine that defines a set of inputs and outputs, and wherein the generator may contain parametric inputs to model non-determinism. The system also receives the trace to be verified (step 404), wherein this trace is a sequence of assignments of non-parametric inputs and outputs for the generator, and wherein the trace does not contain assignments of parametric inputs.

Next, the system uses the specification to build a data structure that can be used to determine if a non-parametric input and output are consistent with the parametric input and output for the generator (step 406). The system then verifies elements of the trace (step 408), wherein verifying the trace involves using the data structure to determine if there exists any parametric input assignment that causes a match between non-parametric inputs and outputs of the generator with the ones specified in the trace.

Sequentially Deterministic

We now present trace checking techniques for sequentially deterministic generators. We further divide the class into structurally sequentially deterministic (SSD) generators and functionally sequentially deterministic (FSD) generators.

SSD

For SSD generators, the next state function $f_S$ is expressed as the composition of functions $\hat{f}_S : S \times \Sigma_{DI} \times \Sigma_O \to S$ and $f_O : S \times \Sigma_{DI} \times \Sigma_P \to \Sigma_O$. Namely, $$f_S(s, d_I, p) = \hat{f}_S(s, d_I, f_O(s, d_I, p))$$

TABLE 3

```
procedure trace-check-ssd( M̌ , π ) {
    R ← ∃p(d_O = f_O(s, d_I, p));
    state ← s_0;
    for(i=0; i < |π|; i++) {
        v_I ← α_{i↓Di};
        v_O ← α_{i↓Do};
        if(R(state, v_I, v_O) = 0)
            return fail;
        state ← f_S(state, v_I, v_O);
    }
    return pass;
}
```

TABLE 4

```
module oneBitError(clk, rst, di, nd, do);
    input clk, rst;
    input [7:0] di;
    input [2:0] nd;
    output [7:0] do;
    reg [7:0] state;
    reg [7:0] do;
    always @(posedge clk or posedge rst) begin
        if (rst)
            state <= 0;
```

TABLE 4-continued

```
        else
            state <= di;
    end
    always @(state or nd) begin
        do = state;
        do[nd] = ~do[nd];
    end
endmodule
```

Such decomposition, if it exists, significantly simplifies the trace checking problem. In particular, $\hat{f}_S$ can be used to efficiently compute the next state of an SSD generator. A trace checking technique is illustrated in Table 3. In Table 3, $\pi$ denotes the length of input trace $\pi$. Furthermore, $v_I$ and $v_O$ denote assignments of design input variables ($d_I$) and design output variables ($d_O$), respectively. The relation R between s, $d_I$ and $d_O$ is represented as a binary decision diagram (BDD) (For a description of a BDD see R. E. Bryant, "Graph-based Algorithms for Boolean Function Manipulation," *IEEE Transactions on Computers*, C-35(8): 677–691, August 1986.)

Table 4 shows an example of SSD generator in Verilog. In an SSD generator, next state functions do not directly depend on parametric inputs. Design inputs, design outputs and current states should form a cut in the fanin logic of every next state assignment. The cut can be computed by syntactical analysis of an SSD generator. Table 4 presents a special case where next state (state) depends only on design inputs (di).

Complexity Analysis

We now analyze the complexity of the SSD trace checking technique in accordance with an embodiment of the present invention. There is a one-time cost to compute BDD R by quantifying parametric inputs p. For each simulation cycle, there is a cost to verify the correctness of design outputs and compute the next state of the generator. Design outputs are verified by evaluating R(state, $v_I$, $v_O$) and checking for the zero result. The cost of the operation is $O(|S|+|D_I|+|D_O|)$, where |S|, |$D_I$| and |$D_O$| denote the numbers of state variables, design inputs and design outputs, respectively. Note that the complexity is independent of the size of BDD R, which in the worst case is exponential in the total number of variables. The next state is computed by evaluating $\hat{f}_S$ (state, $v_I$, $v_O$). This cost is linear in the size of generator representation. In practice, if a generator is written in RTL, its next state can be computed using RTL simulation.

TABLE 5

```
procedure stimulus-generation( M̌ ) {
    R ← (f_v(s, d_I, d_O) = 1);
    state ← s_0;
    for(i=0; i < SimCycles; i++) {
        read(v_I);
        R'(v_O) ← cofactor(R, {v_I, state});
        v_O ← random-pick(R');
        state ← f_S (v_I, v_O, state);
        write(v_O);
    }
}
```

Table 5 outlines a technique for stimulus generation for comparison. Let us suppose that a checker M̌ and a generator M⃗ specify a set of traces using the same state encoding. In this case, the two BDDs (R) of stimulus generation and trace checking are equal. In each simulation cycle, stimulus generation obtains an assignment $v_I$ of design input signals $d_I$ from a simulator. The cofactor operation to compute the set R' of legal assignments of design outputs $d_O$ is O(|R|). If all variables $d_O$ are ordered at the bottom of BDD R, the cofactor R' can be computed in O(|S|+|D$_I$|). Such variable orderings, however, often lead to BDD size explosion. Note that interleaving bits of a data path is a way to achieve a compact BDD representation.

To pick an arbitrary assignment $v_O$ from R' is O(|D$_O$|). It is desirable in practice to generate $v_O$ with certain probability distributions. One can bias individual bits of $d_O$ by traversing the BDD R' and assigning weights to its BDD nodes. The time complexity of this technique is O(|R'|). This technique assumes independence among individual bits and cannot achieve all possible word level distributions. The technique we have described is essentially the SimGen technique (described in J. Yuan, K. Shultz, C. Pixley, H. Miller and A. Aziz, "Modeling Design Constraints and Biasing in Simulation using BDDs," *Proc. Intl. Conference on Computer-Aided Design*, pp. 584–589, November 1999) and has the same complexity. Note that SimGen achieves more practical speed by avoiding BDD operations, operating instead directly on the fixed BDD R.

We now compare the costs of trace checking and stimulus generation. In the both approaches, there is one-time cost to compute BDD R and the memory usage is dominated by computing BDD R and storing R during simulation. The difference is in simulation time cost. For trace checking, per cycle cost is O(|S|+|D$_I$|+|D$_O$|). For stimulus generation, the cost is O(|R|). The size of BDD R is in the worst case exponential in the number of variables. Therefore, per cycle time cost of stimulus generation can be much higher than that of trace checking. It is important to minimize per cycle simulation overhead, as a thorough simulation can require thousands or even millions of cycles.

FSD

In some cases, a generator obeys equation (1), but its next state function is not expressed as a composition $f_S = f_S \circ f_O$. We call such generators functionally sequentially deterministic (FSD). The condition defined by Equation (1) can be verified by evaluating the expression using BDD operations. This evaluation involves building BDDs for the next state function and can be expensive. Alternatively, the condition can be checked dynamically as a part of trace checking.

TABLE 6

```
procedure trace-check-fsd( M̃ , π) {
    R ←(d_O = f_o(s, d_I, p));
    state ←s_0;
    for(i=0;i < |π|; i++) {
        v_I ←α_{i↓Di};
        v_O ←α_{i↓Do};
        P = cofactor(R,{state,v_I,v_O});
        if(P = ∅)
            return fail;
        pick p ∈ P;
        state ←f_s (state, {v_I,p}v_O);
        if(CHECK-FSD) {
            S ←image(state,v_I, P);
            if(|S| > 1)
                return notFSD;
        }
    }
    return pass;
}
```

A technique for FSD trace checking is illustrated in Table 6. The cofactor operation returns a set of parametric inputs assignments P that can produce generator outputs $v_O$. With the CHECK-FSD option turned on, the technique computes the set of next states by image computation while constraining design inputs to be $v_I$ and parametric inputs to be in P, and it checks that the set is a singleton, i.e. all parametric inputs in P lead to a single next state. In fact, the FSD technique is sound with a somewhat more general condition Equation (1) only has to hold for the specified design inputs from a trace and reached states.

Optimizations

So far, we have proposed to use BDDs to implement trace checking techniques. In particular, relation R is represented as a BDD with s, $d_I$ and $d_O$ as variables. The advantage of this static approach is that per cycle cost of trace checking is minimized. In some cases, however, computing the BDD may be too expensive in either time or memory usage.

Let us re-examine the technique illustrated in Table 3. An important operation on R is its evaluation after substitution of state, design input and output variables. Rather than building a BDD for R, we can simply maintain $d_O = f_O(s, d_I, p)$ as a boolean expression, i.e. we can omit the explicit quantification of the p variables. At each cycle, we substitute the $d_O$, s, and $d_I$ variables in this expression with their assigned values and obtain a much simplified expression with only p variables. Now there are two choices.

We can either build a BDD for the simplified expression and test for its emptiness or use a SAT solver to test the unsatisfiability of the expression. Both operations are much cheaper than computing a BDD for R. Unfortunately, the operations must be repeated for each cycle of the simulation. This technique also applies to the FSD procedure illustrated in Table 6. In particular, we can use a SAT solver to find an assignment "p" of parametric inputs instead of computing cofactor of BDD R. The FSD condition can be verified by proving any two legal parametric input assignments lead to a same next state. This verification can be expressed as an unsatisfiablity problem and therefore can be handled by a SAT solver as well.

Sequentially Non-Deterministic

A generator is sequentially non-deterministic (SND) if legal parametric inputs can lead to distinct next states, each of which may later pass or fail the trace under test. In this case, a set of "accepting" generator states must be maintained for each simulation cycle, and trace checking is essentially reachability analysis with input/output constraints. Table 7 presents a technique for this general case of generators.

TABLE 7

```
procedure trace-check-snd( M̃ , π) {
    S ←{s_0};
    for(i=0;i < |π|; i++) {
        v_I ←α_{i↓Di};
        v_O ←α_{i↓Do};
        S' ←∃s∃p(s' = f_s(s,v_I,p) ∧s ∈ S ∧v_O = f_O(s,v_I,p));
        if(S' = ∅)
            return fail;
        else
            S ←S';
    }
    return pass;
}
```

Refinement Checking

We consider formal refinement checking as a comparison of two Mealy machines, a module machine $\vec{M}^m = \langle S^m, s_0^m, D_I, O, f_O^m, f_S^m \rangle$, and a generator machine $\vec{M}^g = \langle S^g, s_0^g, I, O, f_O^g, f_S^g \rangle$, where $I = D_I \cup P$, i.e. the generator has some extra parametric inputs to model non-determinism. The general refinement checking problem is to verify whether every input/output trace of the module can be observed in the generator (after projecting out the parametric inputs). The special case of sequentially deterministic generators permits a more efficient solution than the general case. In this special case, we can explore the state space of the product machine, considering only transitions for which the output of the generator matches the output of the module, i.e. we can form the constrained product machine transition relation $$T(s_p^m, s_p^g, s_n^m, s_n^g) = \exists\, p \exists\, d_I \begin{bmatrix} (f_O^m(s_p^m, d_I) = f_O^g(s_p^g, d_I, p)) \\ \wedge (s_n^m = f_S^m(s_p^m, d_I)) \\ \wedge (s_n^g = f_S^g(s_p^g, d_I, p)) \end{bmatrix} \quad (2)$$

At each state of the product machine reachable by way of these transitions, there must be a generator output corresponding to every module output, i.e. the product state must satisfy $$v(s^m, s^g) = \exists d_I \exists p[(f_O^m(s^m, d_I) = f_O^g(s^g, d_I, p))] \quad (3)$$

Thus, the special case of refinement checking for sequentially deterministic generators can be reduced to a classical model checking problem of a safety property, checking that the initial state $(s_0^m, s_0^g)$ satisfies the CTL property AGv in the transition system defined by T.

This approach to refinement checking actually handles a somewhat broader class of generators than just sequentially deterministic. In a sequentially deterministic generator there will be only one generator next states $s_n^g$ corresponding to a product machine present state $(s_p^m, s_p^g)$ and design input $d_I$. But our refinement check will allow several corresponding next states, as long as each of them satisfies AGv. While we can thus verify refinement in a somewhat broader class of generators than the sequentially deterministic class, this is still much narrower than refinement in general, where an arbitrary non-empty subset of corresponding generator next states needs to exist that can carry forward the correspondence.

Formal Checking

As discussed above, refinement checking for sequentially deterministic generators reduces to a safety property check. A wide variety of techniques have been explored for such checks. In one embodiment of the present invention, we can use the abstraction refinement approach described in D. Wang, P.-H. Ho, J. Long, J. H. Kukula, Y. Zhu, H.-K. T Ma and R. Damaino, "Formal Property Verification by Abstraction Refinement with Formal, Simulation and Hybrid Engines," *Design Automation Conference*, pp. 35–40, 2001. This embodiment requires the transition system and property to be provided in the form of an RTL circuit. A BDD can be computed for property v of equation (3). A circuit for v can then be synthesized from this BDD, in the form of a multiplexer network.

Building a circuit for the transition system T of equation (2) is a bit more challenging. What is required is that the parametric inputs p of the generator be constrained so that the module and generator outputs correspond at every cycle. In a simulation-based methodology, this would form a classical constrained stimulus generation problem. For our formal refinement checking implementation we used a simpler method. We added an auxiliary state bit to the product machine, initially assigned to 1 and remaining 1 just as long as the input constraint is satisfied. This bit is then used to qualify the predicate v, so a property violating state is one where v=0, reached by a path on which the module and generator outputs have corresponded at all previous time steps.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above description is not intended to limit the present invention. The scope of the present invention is defined by the appended claims.

What is claimed is:

1. A method for verifying whether a trace can be produced by a generator, comprising:
   receiving a specification for the generator, wherein the generator is a finite state machine that defines a set of inputs and outputs, and wherein the generator contains parametric inputs to model non-determinism;
   receiving the trace, wherein the trace is a sequence of assignments of non-parametric inputs and outputs for the generator, and wherein the trace does not contain assignments of parametric inputs;
   using the specification to build a data structure that can be used to determine if a non-parametric input and output are consistent with the current state of the generator;
   verifying elements of the trace, wherein verifying a given element involves using the data structure to determine if there exists any parametric input assignment that causes a match between non-parametric inputs and outputs of the generator with the ones specified in the given element of the trace; and
   if the specification of the generator is sequentially deterministic, and hence does not depend on parametric inputs, translating the generator into a checker and using that checker to verify the trace.

2. The method of claim 1,
   wherein the generator is sequentially deterministic, which means that there exists a single next state for each combination of current state, non-parametric input, and output; and
   wherein using the data structure to determine if there exists any parametric input assignment involves,
      using the data structure to perform a satisfiability test to determine if there exist any parametric inputs that can match the non-parametric input and output assignment of the generator with the ones of the trace at a current state, and
      computing a unique next state based on the current state, the non-parametric input and the output.

3. The method of claim 1,
   wherein the generator is sequentially non-deterministic, which means that the next state can depend on a parametric input, and consequently there can exist more than one next state for some combinations of current state, non-parametric input, and output; and
   wherein using the data structure to determine if there exists any parametric input assignment involves determining a set of next states;

wherein determining the set of next states involves considering all possible parametric inputs, all states in a current set of states, the non-parametric input and the output;

wherein if there exists at least one state in the set of next states, the non-parametric input and output are consistent with the generator.

4. The method of claim 3, wherein determining the set of next states involves computing a forward image and constraining the parametric input and output to their assignments in the trace.

5. The method of claim 1, wherein the trace is produced by a simulation of a system under test.

6. The method of claim 1, wherein the data structure is in the form of a binary decision diagram (BDD).

7. The method of claim 1, wherein if for all possible parametric inputs the non-parametric input and output are not consistent with a generator output, the trace is not valid.

8. A computer-readable storage medium storing instructions that when executed by a computer cause the computer to perform method for verifying whether a trace can be produced by a generator, comprising:

receiving a specification for the generator, wherein the generator is a finite state machine that defines a set of inputs and outputs, and wherein the generator contains parametric inputs to model non-determinism;

receiving the trace, wherein the trace is a sequence of assignments of non-parametric inputs and outputs for the generator, and wherein the trace does not contain assignments of parametric inputs;

using the specification to build a data structure that can be used to determine if a non-parametric input and output are consistent with a parametric input and output for the generator;

verifying elements of the trace, wherein verifying a given element involves using the data structure to determine if there exists any parametric input assignment that causes a match between non-parametric inputs and outputs of the generator with the ones specified in the given element of the trace; and if the specification of the generator is sequentially deterministic, and hence does not depend on parametric inputs, translating the generator into a checker and using that checker to verify the trace.

9. The computer-readable storage medium of claim 8, wherein the generator is sequentially deterministic, which means that there exists a single next state for each combination of current state, non-parametric input, and output; and wherein using the data structure to determine if there exists any parametric input assignment involves, using the data structure to perform a satisfiability test to determine if there exist any parametric inputs that can match the non-parametric input and output assignment of the generator with the ones of the trace at a current state, and computing a unique next state based on the current state, the non-parametric input and the output.

10. The computer-readable storage medium of claim 8, wherein the generator is sequentially non-deterministic, which means that the next state can depend on a parametric input, and consequently there can exist more than one next state for some combinations of current state, non-parametric input, and output; and wherein using the data structure to determine if there exists any parametric input assignment involves determining a set of next states of a generator;

wherein determining the set of next states involves considering all possible parametric inputs, all states in a current set of states, the non-parametric input and the output;

wherein if there exists at least one state in the set of next states, the non-parametric input and output are consistent with the generator.

11. The computer-readable storage medium of claim 10, wherein determining the set of next states involves computing a forward image and constraining the parametric input and output to their assignments in the trace.

12. The computer-readable storage medium of claim 8, wherein the trace is produced by a simulation of a system under test.

13. The computer-readable storage medium of claim 8, wherein the data structure is in the form of a binary decision diagram (BDD).

14. The computer-readable storage medium of claim 8, wherein if for all possible parametric inputs the non-parametric input and output are not consistent with a generator output, the trace is not valid.

15. An apparatus that verifies whether a trace can be produced by a generator, comprising:

a receiving mechanism configured to receive a specification for the generator, wherein the generator is a finite state machine that defines a set of inputs and outputs, and wherein the generator contains parametric inputs to model non-determinism;

wherein the receiving mechanism is additionally configured to receive the trace, wherein the trace is a sequence of assignments of non-parametric inputs and outputs for the generator, and wherein the trace does not contain assignments of parametric inputs;

a data structure building mechanism configured to use the specification to build a data structure that can be used to determine if a non-parametric input and output are consistent with a parametric input and output for the generator;

a verification mechanism configured to verify elements of the trace, wherein verifying a given element involves using the data structure to determine if there exists any parametric input assignment that causes a match between non-parametric inputs and outputs of the generator with the ones specified in the given element of the trace; and a translation mechanism configured to translate the generator into a checker and use that checker to verify the trace if the specification of the generator is sequentially deterministic, and hence does not depend on parametric inputs.

16. The apparatus of claim 15, wherein the generator is sequentially deterministic, which means that there exists a single next state for each combination of current state, non-parametric input, and output; and wherein while using the data structure to determine if there exists any parametric input assignment, the verification mechanism is configured to, use the data structure to perform a satisfiability test to determine if there exist any parametric inputs that can match the non-parametric input and output assignment of the generator with the ones of the trace at a current state, and to compute a unique next state based on the current state, the non-parametric input and the output.

17. The apparatus of claim 15,
wherein the generator is sequentially non-deterministic, which means that the next state can depend on a parametric input, and consequently there can exist more than one next state for some combinations of current state, non-parametric input, and output; and
wherein while using the data structure to determine if there exists any parametric input assignment, the verification mechanism is configured to determine a set of next states of a generator;
wherein determining the set of next states involves considering all possible parametric inputs, all states in a current set of states, the non-parametric input and the output;
wherein if there exists at least one state in the set of next states, the non-parametric input and output are consistent with the generator.

18. The apparatus of claim 17, wherein while determining the set of next states the verification mechanism is configured to compute a forward image and constraining the parametric input and output to their assignments in the trace.

19. The apparatus of claim 15, wherein the trace is produced by a simulation of a system under test.

20. The apparatus of claim 15, wherein the data structure is in the form of a binary decision diagram (BDD).

21. The apparatus of claim 15, wherein if for all possible parametric inputs the non-parametric input and output are not consistent with a generator output, the trace is not valid.

22. A means for verifying whether a trace can be produced by a generator, comprising:

a receiving means for receiving a specification for the generator, wherein the generator is a finite state machine that defines a set of inputs and outputs, and wherein the generator contains parametric inputs to model non-determinism;

wherein the receiving means is additionally configured to receive the trace, wherein the trace is a sequence of assignments of non-parametric inputs and outputs for the generator, and wherein the trace does not contain assignments of parametric inputs;

a data structure building means configured to use the specification to build a data structure that can be used to determine if a non-parametric input and output are consistent with a parametric input and output for the generator;

a verification means configured to verify elements of the trace, wherein verifying a given element involves using the data structure to determine if there exists any parametric input assignment that causes a match between non-parametric inputs and outputs of the generator with the ones specified in the given element of the trace; and a translation means configured to translate the generator into a checker and use that checker to verify the trace if the specification of the generator is sequentially deterministic, and hence does not depend on parametric inputs.

* * * * *